UNITED STATES PATENT OFFICE.

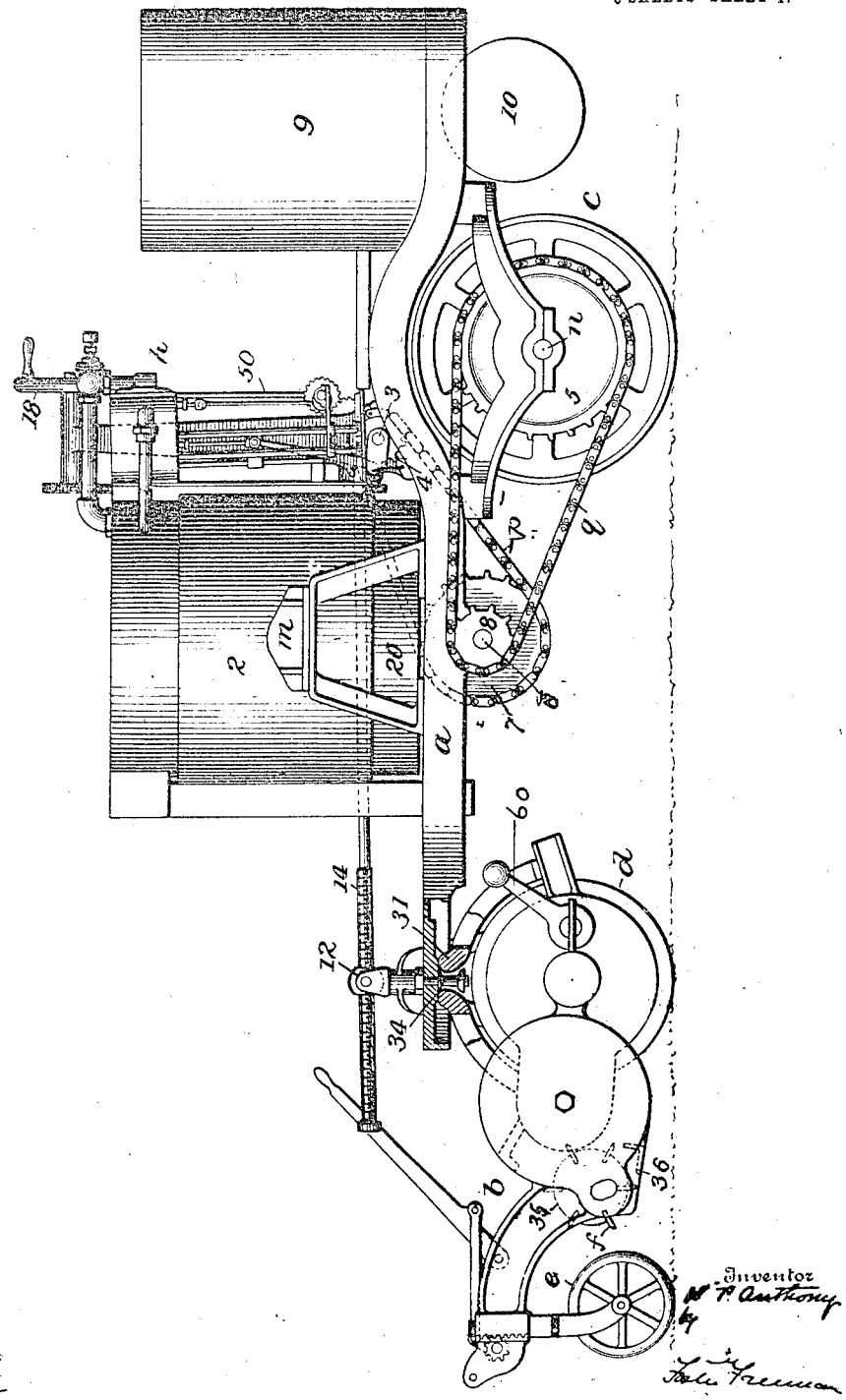

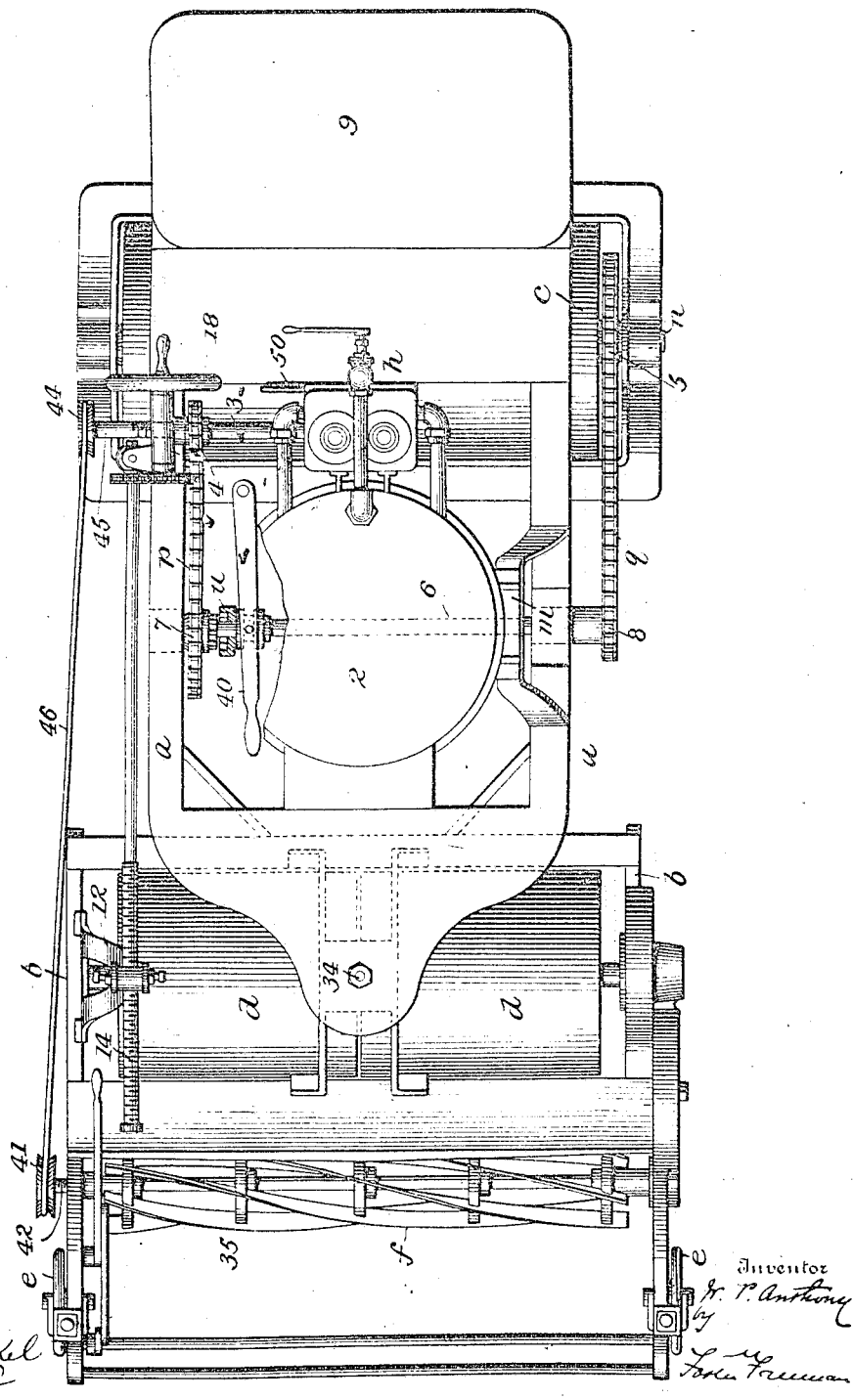

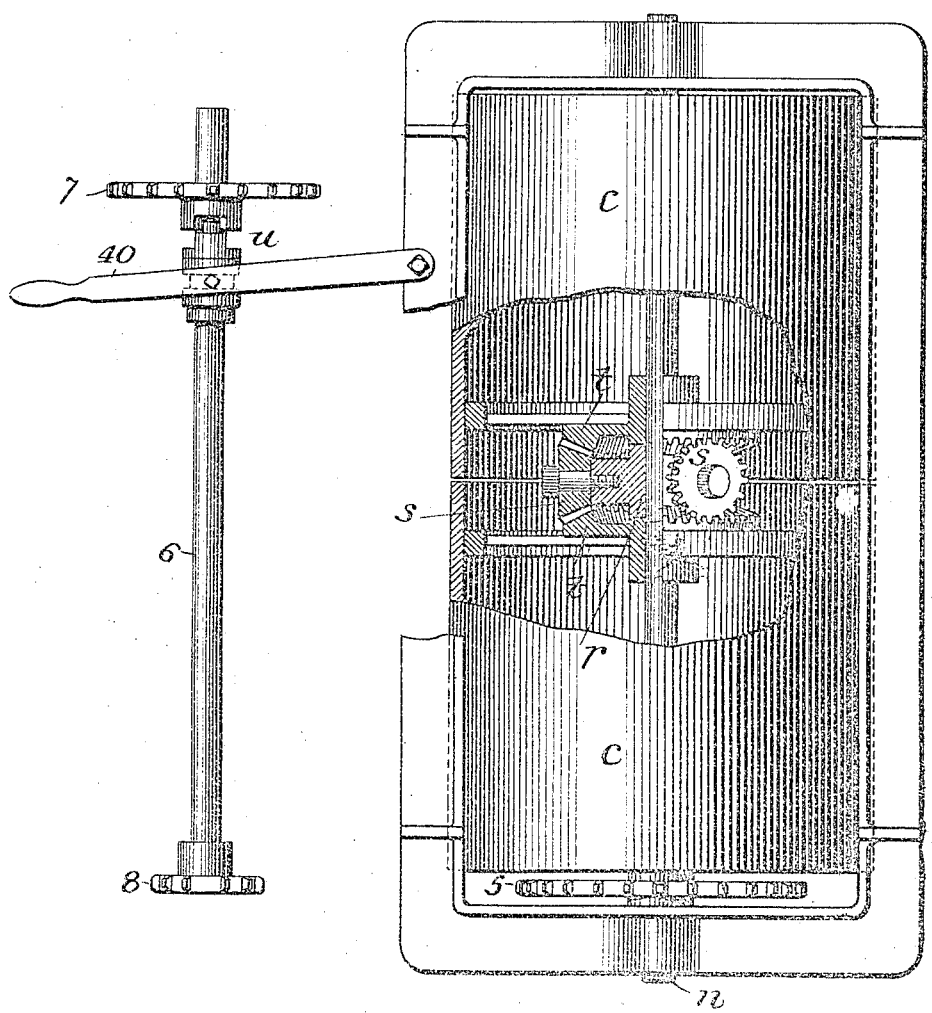

WENDELL P. ANTHONY, OF RIDLEY PARK, PENNSYLVANIA, ASSIGNOR TO WILLIAM P. SIMPSON, OF OVERBROOK, PENNSYLVANIA.

MOTOR-PROPELLED LAWN CUTTER AND ROLLER.

No. 799,024.　　　Specification of Letters Patent.　　　Patented Sept. 12, 1905.

Application filed March 14, 1901. Serial No. 51,151.

*To all whom it may concern:*

Be it known that I, WENDELL P. ANTHONY, a citizen of the United States, residing at Ridley Park, Delaware county, State of Pennsylvania, have invented certain new and useful Improvements in Motor-Propelled Lawn Cutters and Rollers, of which the following is a specification.

My invention relates to lawn mowers and rollers that are actuated by power; and it consists in certain improvements whereby to secure increased efficiency in the apparatus, as fully set forth hereinafter and as illustrated in the accompanying drawings, in which—

Figure 1 is a side view of the apparatus in part section; Fig. 2, a plan view, and Fig. 3 a sectional part plan.

The frame $a$ is of any suitable construction and is supported at the rear by a traction and lawn-rolling roller $c$, which may in some instances be continuous, but which, as shown, is in two sections, the inner ends abutting with a shaft $n$, about which the roller turns.

A secondary frame $b$ supports the lawn mower or cutters $f$, which may be of any suitable construction, the said frame being supported by wheels or drums at its opposite ends as, for instance, by a drum $d$ in two sections at the rear and swiveled or caster wheels $e$ at the front. Any other suitable roller-support for the frame $b$ may, however, be employed.

The two frames $a$ $b$ are flexibly connected, so that each may accommodate itself to the inequalities of the ground without straining the connections and preferably so that the frame $b$ may swing about a pivotal point in such manner as to constitute a guiding-truck for the main frame. As shown, the forward end of the frame $a$ rests upon a block 31 of the frame $b$, which block is recessed to receive a pivot-pin 34, extending downward from the frame $a$, so that the frame $b$ may turn about said block and may also swing laterally and longitudinally independently of the frame $a$, thus securing the desired positive but flexible connection between the two frames.

Any suitable means may be employed for swinging the frame $b$ as, for instance, the screw-shaft 14, turned by gearing from a hand-wheel 18 and passing through a nut upon a standard 12, projecting from one side of the frame $b$.

Upon the frame $a$ is mounted a motor or engine $h$, which, as shown, is a steam-engine, and in order that the said engine may operate with the desired rapidity, while at the same time imparting to the apparatus that relatively slow movement which is demanded in consequence of the necessarily slow advance of the mower devices, while at the same time avoiding the objections to direct gearing between the engine and the traction-wheels, I make use of a counter-shaft and gearing between the engine and traction-rollers. As shown, the shaft 3 of the engine is provided with a sprocket-wheel 4, and the counter-shaft 6 is provided with sprocket-wheels 7 and 8, the said counter-shaft turning in bearings on the main frame, and a sprocket-chain $p$ passes from the wheel 4 to the wheel 7 and a sprocket-chain $q$ from the wheel 8 to a wheel 5 upon the shaft $n$ of the traction-rolls. By this means I am able to proportion the gears so as to permit the engine to operate at any desired rate of speed (which is advantageous in the case of steam-engines and essential in the case of a gas-engine) and at the same time limit the rate of movement of the apparatus to the capacity of travel of the mower devices.

Heretofore in power-driven apparatus provided with lawn-rollers or road-rollers it has been common to secure the roll, or both sections of the roll, to the shaft, so that they turn therewith, an arrangement which is not objectionable in the case of road-rollers, but which is very detrimental to a lawn in the case of a power-driven lawn-mower, as a change of direction of the machine results in a drag of one of the wheels or rolls that is injurious to the grass. In order to avoid this objection, I interpose between the sections of the roll a compensating gear. As shown, this is so arranged that the inner ends of the two sections of the roll may be brought closely together, so that not only is the compensating gear covered and protected, but the streaking or ribbing of the grass, which results if the two roll-sections are separated, is avoided. As shown, the shaft $n$ turns freely in the ends of each roll-section and carries a spider $r$, with radial studs about which turn bevel-pinions $s$, gearing with bevel-wheels $t$ $t$ at the inner ends of the roll-sections, as shown in Fig. 3.

In the use of certain classes of burners as, for instance, certain forms of vapor-burners the burner 20 is secured below the boiler 2, so as to be detachable therefrom, and it is necessary to so support the boiler as to permit ready detachment. I secure this result by the use of side brackets m m, each bolted at the lower end to the frame a at one side of the boiler and extending upward and secured to the side of the boiler, as shown. I thus secure a firm support of the boiler, while permitting ready access to the burner beneath the same.

The water for the boiler is contained in a tank 9 and the liquid fuel in a tank 10.

It is frequently necessary in order to sharpen the rotating cutter of the mower to rotate the same rapidly in connection with a sharpening device. One means consists in rotating the cutter-head 35 backward, with the edges of the blades against the cutter-blade 36. In order to permit this to be done by power, I interpose between the engine and the gear for driving the roll c a clutch device u, which may be thrown out to permit the engine to operate without driving the traction-roll, and I provide gearing between the engine and the rotating cutter. As shown, the clutch u is operated by means of a lever 40, and a grooved roll 41 is secured to a screw-shaft 42, adapted to a threaded socket in the end of the shaft of the cutter-head 35, and a similar grooved wheel 44 is upon a screw-shaft 45, adapted to a threaded socket in the end of the crank-shaft 3 of the engine. The lever 60 operates to connect and disconnect the usual clutch between the shaft of the driving-roll d and the gears for driving the rotary cutter 35 therefrom.

When the mower is to be sharpened, the grooved wheels 41 44 are secured in place and a belt 46 is passed around both of them, the clutch u is disconnected, and the engine started in operation in the reverse direction, determined by the reversing-lever 50.

I do not here claim any of the features shown and described and which are set forth and claimed in the United States Letters Patent of W. P. Simpson, No. 706,864, dated August 12, 1902, as these features are not my invention.

Without limiting myself to the precise construction and arrangement of parts shown, I claim as my invention—

1. The combination in a combined lawn roller and cutter, of a main frame, a driving-roll, a rolling-roll provided with a frame jointed to the main frame to swing and rock independently thereof, a cutter-frame supported to swing about the shaft of said rolling-roll, and a motor and gearing whereby to drive the driving-roll therefrom at a reduced speed, substantially as set forth.

2. The combination with the main frame and cutter-frame connected to rock transversely independently of each other, of a mower-frame carrying a roller and a rotary cutter driven therefrom, an engine carried by the main frame, and traction and rolling roll, gearing and a clutch device between the engine and the said roll, and means for rotating the rotary cutter from said engine to sharpen the cutters, substantially as set forth.

In testimony whereof I have signed my name to this specification in the presence of two subscribing witnesses.

WENDELL P. ANTHONY.

Witnesses:
 GEO. E. SMALL,
 THOS. E. STRING.